United States Patent
Chandra et al.

(10) Patent No.: US 10,880,371 B2
(45) Date of Patent: Dec. 29, 2020

(54) CONNECTING AN INITIATOR AND A TARGET BASED ON THE TARGET INCLUDING AN IDENTITY KEY VALUE PAIR AND A TARGET CHARACTERISTIC KEY VALUE PAIR

(71) Applicant: International Business Machines Corporation, Armonk, NY (US)

(72) Inventors: Anuj Chandra, Pune (IN); Komal S. Shah, Pune (IN); Subhojit Roy, Pune (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/293,460

(22) Filed: Mar. 5, 2019

(65) Prior Publication Data

US 2020/0287966 A1 Sep. 10, 2020

(51) Int. Cl.
*G06F 15/167* (2006.01)
*H04L 29/08* (2006.01)
*H04L 29/06* (2006.01)

(52) U.S. Cl.
CPC ........ *H04L 67/1068* (2013.01); *H04L 67/147* (2013.01); *H04L 67/16* (2013.01); *H04L 69/163* (2013.01)

(58) Field of Classification Search
CPC ... H04L 67/1068; H04L 67/147; H04L 67/16; H04L 69/163
USPC ........................................................ 709/212
See application file for complete search history.

(56) References Cited

U.S. PATENT DOCUMENTS

| | | | | |
|---|---|---|---|---|
| 6,865,617 B2* | 3/2005 | Zeidner | ............... | G06F 11/2066 710/3 |
| 7,343,621 B2* | 3/2008 | Spry | ....................... | H04L 63/08 726/16 |
| 7,529,884 B2* | 5/2009 | Nakatsuka | .............. | H04L 67/16 711/112 |
| 7,664,839 B1 | 2/2010 | Karr et al. | | |

(Continued)

OTHER PUBLICATIONS

Satran et al., "Internet Small Computer Systems Interface (iSCSI)", The Internet Society, Apr. 2004, pp. 257, Retrieved From https://tools.ietf.org/html/rfc3720#appendix-D.

*Primary Examiner* — Alicia Baturay
(74) *Attorney, Agent, or Firm* — Zilka-Kotab, P.C.

(57) ABSTRACT

A computer-implemented method according to one embodiment includes establishing, by an initiator, a discovery session type. A request is sent by the initiator for identifying a target. The request includes an identity key value pair that specifies at least one target identity, and a target characteristic key value pair that specifies a target characteristic. A response is received by the initiator from a target matching the key value pairs. The response includes path information of the target. In response to receiving the response the target is connected to by the initiator using the path information. A computer program product for establishing a connection between an initiator and a target according to one embodiment includes a computer readable storage medium having program instructions embodied therewith. The program instructions are readable and/or executable by an initiator to cause the initiator to perform the foregoing method.

17 Claims, 4 Drawing Sheets

(56) References Cited

U.S. PATENT DOCUMENTS

| | | | | |
|---|---|---|---|---|
| 7,673,077 | B2* | 3/2010 | Gupta | H04L 67/1097 710/8 |
| 7,886,139 | B2* | 2/2011 | Hernandez | H04L 67/1097 713/2 |
| 9,225,801 | B1* | 12/2015 | McMullen | G06F 16/84 |
| 10,462,221 | B2* | 10/2019 | Siddappa | H04L 67/1012 |
| 2002/0191602 | A1* | 12/2002 | Woodring | H04L 41/12 370/389 |
| 2003/0177174 | A1* | 9/2003 | Allen | H04L 67/1097 709/203 |
| 2004/0054776 | A1* | 3/2004 | Klotz | H04L 41/06 709/224 |
| 2005/0198186 | A1* | 9/2005 | Griv | H04L 67/16 709/212 |
| 2006/0004837 | A1 | 1/2006 | Genovker et al. | |
| 2015/0095515 | A1 | 4/2015 | Krithivas et al. | |
| 2019/0342177 | A1* | 11/2019 | Shah | H04L 41/0893 |
| 2019/0370079 | A1* | 12/2019 | Ramesh | G06F 3/061 |

* cited by examiner

CONNECTING AN INITIATOR AND A TARGET BASED ON THE TARGET INCLUDING AN IDENTITY KEY VALUE PAIR AND A TARGET CHARACTERISTIC KEY VALUE PAIR

BACKGROUND

The present invention relates to network communication sessions, and more specifically, this invention relates to establishing a connection between an initiator and target that is determined to include an identity key value pair and a target characteristic key value pair.

Communication between computers systems within a network often occur using an Internet Small Computer Systems Interface (iSCSI). Specifically, iSCSI is a protocol for managing, e.g., initiating, establishing, terminating, etc., the interactions of computers at different locations within a network. For example, iSCSI is often used for managing the transfer of data from one physical storage location to a remote storage location over an Ethernet network. However, due to the provided interface, a client that is using iSCSI to transfer such data is often not aware of the physical distance that may exist between such different physical storage locations.

SUMMARY

A computer-implemented method according to one embodiment includes establishing, by an initiator, a discovery session type. A request is sent by the initiator for identifying a target. The request includes an identity key value pair that specifies at least one target identity, and a target characteristic key value pair that specifies a target characteristic. A response is received by the initiator from a target matching the key value pairs. The response includes path information of the target. In response to receiving the response the target is connected to by the initiator using the path information.

A computer program product for establishing a connection between an initiator and a target according to one embodiment includes a computer readable storage medium having program instructions embodied therewith. The program instructions are readable and/or executable by an initiator to cause the initiator to perform the foregoing method.

A computer-implemented method according to one embodiment includes receiving, by a target, a request from an initiator. The request includes an identity key value pair that specifies at least one target identity, and a target characteristic key value pair that specifies a target characteristic. The method further includes sending, by the target, a response to the initiator. The response indicates that key value pairs of the target match the key value pairs of the received request. The request further includes path information of the target. The initiator is connected to by the target using the path information.

Other aspects and embodiments of the present invention will become apparent from the following detailed description, which, when taken in conjunction with the drawings, illustrate by way of example the principles of the invention.

DETAILED DESCRIPTION

Figure 1:
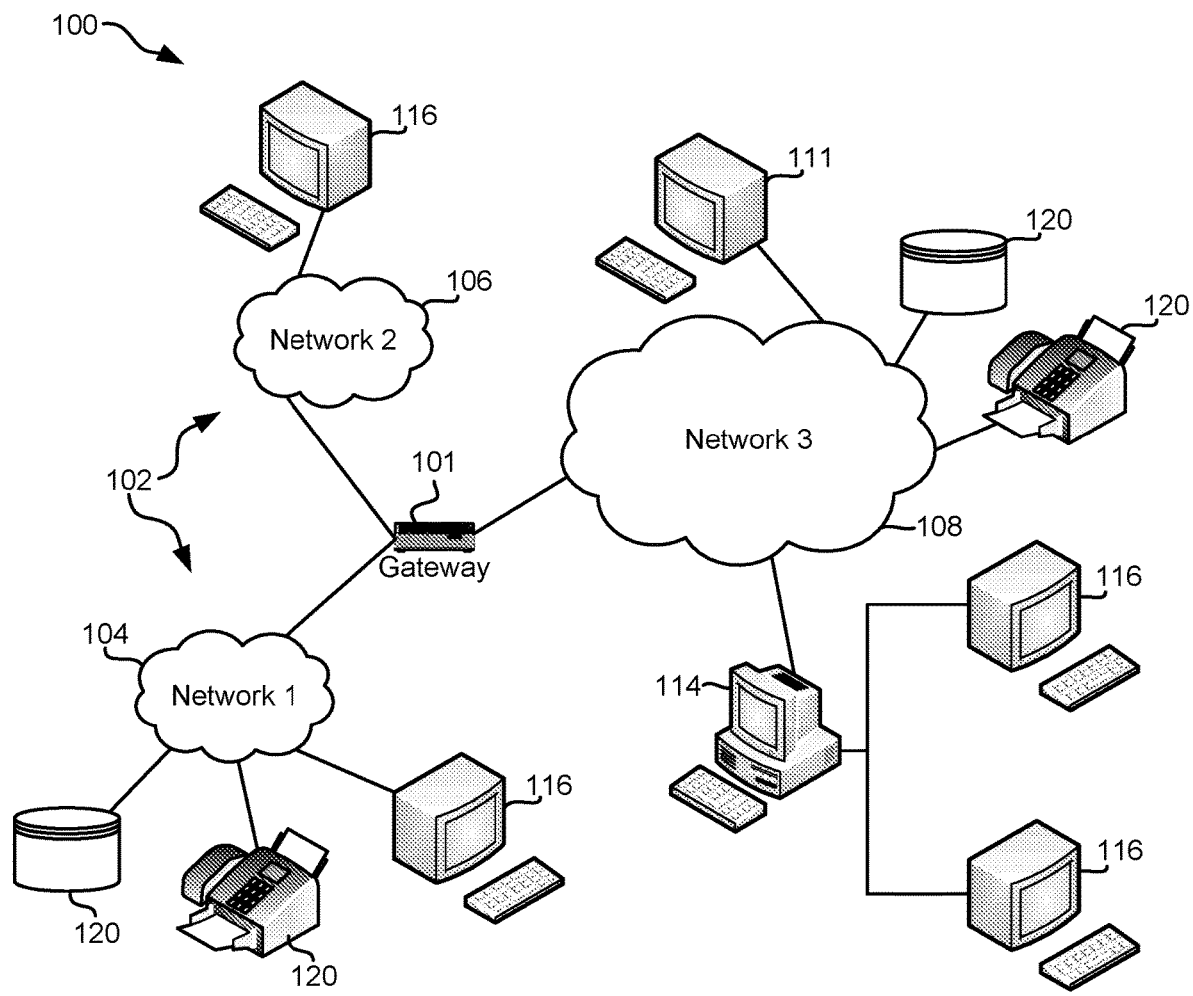
FIG. 1 is a network architecture, in accordance with one embodiment.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The following description discloses several preferred embodiments of systems, methods and computer program products for establishing a connection between an initiator and target that is determined to include a target identity key value pair and a target characteristic key value pair.

In one general embodiment, a computer-implemented method includes establishing, by an initiator, a discovery session type. A request is sent by the initiator for identifying a target. The request includes an identity key value pair that specifies at least one target identity, and a target characteristic key value pair that specifies a target characteristic. A response is received by the initiator from a target matching the key value pairs. The response includes path information of the target. In response to receiving the response the target is connected to by the initiator using the path information.

In another general embodiment, a computer program product for establishing a connection between an initiator and a target includes a computer readable storage medium having program instructions embodied therewith. The program instructions are readable and/or executable by an initiator to cause the initiator to perform the foregoing method.

In another general embodiment, a computer-implemented method includes receiving, by a target, a request from an initiator. The request includes an identity key value pair that specifies at least one target identity, and a target characteristic key value pair that specifies a target characteristic. The method further includes sending, by the target, a response to the initiator. The response indicates that key value pairs of the target match the key value pairs of the received request. The request further includes path information of the target. The initiator is connected to by the target using the path information.

FIG. 1 illustrates an architecture 100, in accordance with one embodiment. As shown in FIG. 1, a plurality of remote networks 102 are provided including a first remote network 104 and a second remote network 106. A gateway 101 may be coupled between the remote networks 102 and a proximate network 108. In the context of the present architecture 100, the networks 104, 106 may each take any form including, but not limited to a local area network (LAN), a wide area network (WAN) such as the Internet, public switched telephone network (PSTN), internal telephone network, etc.

In use, the gateway 101 serves as an entrance point from the remote networks 102 to the proximate network 108. As such, the gateway 101 may function as a router, which is capable of directing a given packet of data that arrives at the gateway 101, and a switch, which furnishes the actual path in and out of the gateway 101 for a given packet.

Further included is at least one data server 114 coupled to the proximate network 108, and which is accessible from the remote networks 102 via the gateway 101. It should be noted that the data server(s) 114 may include any type of computing device/groupware. Coupled to each data server 114 is a plurality of user devices 116. User devices 116 may also be connected directly through one of the networks 104, 106, 108. Such user devices 116 may include a desktop computer, lap-top computer, hand-held computer, printer or any other type of logic. It should be noted that a user device 111 may also be directly coupled to any of the networks, in one embodiment.

A peripheral 120 or series of peripherals 120, e.g., facsimile machines, printers, networked and/or local storage units or systems, etc., may be coupled to one or more of the networks 104, 106, 108. It should be noted that databases and/or additional components may be utilized with, or integrated into, any type of network element coupled to the networks 104, 106, 108. In the context of the present description, a network element may refer to any component of a network.

According to some approaches, methods and systems described herein may be implemented with and/or on virtual systems and/or systems which emulate one or more other systems, such as a UNIX system which emulates an IBM z/OS environment, a UNIX system which virtually hosts a MICROSOFT WINDOWS environment, a MICROSOFT WINDOWS system which emulates an IBM z/OS environment, etc. This virtualization and/or emulation may be enhanced through the use of VMWARE software, in some embodiments.

In more approaches, one or more networks 104, 106, 108, may represent a cluster of systems commonly referred to as a "cloud." In cloud computing, shared resources, such as processing power, peripherals, software, data, servers, etc., are provided to any system in the cloud in an on-demand relationship, thereby allowing access and distribution of services across many computing systems. Cloud computing typically involves an Internet connection between the systems operating in the cloud, but other techniques of connecting the systems may also be used.

Figure 2:
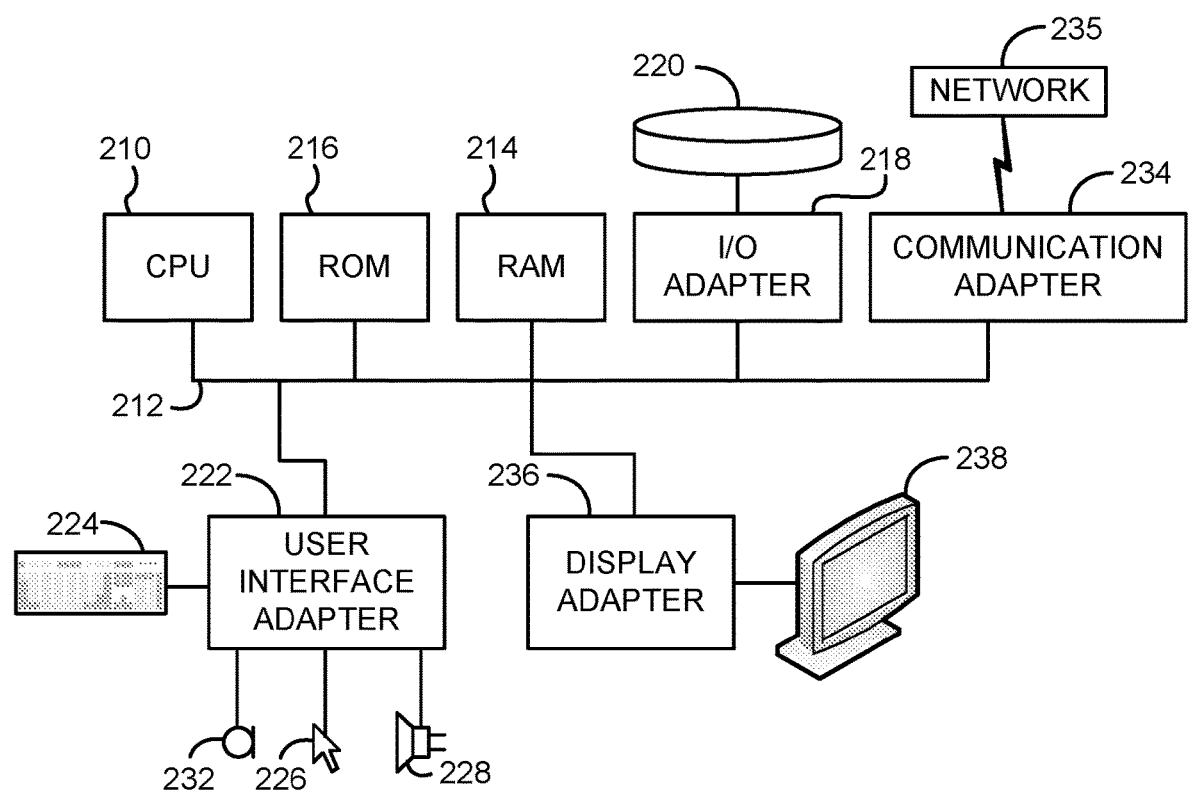
FIG. 2 is a representative hardware environment that may be associated with the servers and/or clients of FIG. 1, in accordance with one embodiment.

FIG. 2 shows a representative hardware environment associated with a user device 116 and/or server 114 of FIG. 1, in accordance with one embodiment. Such figure illustrates a typical hardware configuration of a workstation having a central processing unit 210, such as a microprocessor, and a number of other units interconnected via a system bus 212.

The workstation shown in FIG. 2 includes a Random Access Memory (RAM) 214, Read Only Memory (ROM) 216, an input/output (I/O) adapter 218 for connecting peripheral devices such as disk storage units 220 to the bus 212, a user interface adapter 222 for connecting a keyboard 224, a mouse 226, a speaker 228, a microphone 232, and/or other user interface devices such as a touch screen and a digital camera (not shown) to the bus 212, communication adapter 234 for connecting the workstation to a communication network 235 (e.g., a data processing network) and a display adapter 236 for connecting the bus 212 to a display device 238.

The workstation may have resident thereon an operating system such as the Microsoft Windows® Operating System (OS), a MAC OS, a UNIX OS, etc. It will be appreciated that a preferred embodiment may also be implemented on platforms and operating systems other than those mentioned. A preferred embodiment may be written using eXtensible Markup Language (XML), C, and/or C++ language, or other programming languages, along with an object oriented programming methodology. Object oriented programming (OOP), which has become increasingly used to develop complex applications, may be used.

As mentioned elsewhere herein, communication between computers systems within a network often occur using an iSCSI connection. Specifically, iSCSI is a protocol for managing, e.g., initiating, establishing, terminating, etc., the interactions of computers of different locations within a network, e.g., such as an Ethernet network. For example, iSCSI is often used for managing the transfer of data from one physical storage location to a remote storage location over an Ethernet network. However, due to the provided interface, a client that is using iSCSI to transfer such data is often not aware of the physical distance that may exist between such different such physical storage locations.

One specific technique of using iSCSI includes discovering a target to connect with using conventional SendTargets method(s). Such an iSCSI specification was originally defined for communication over native Transmission Control Protocol/Internet Protocol (TCP/IP) networks. The discovery result of the iSCSI specification is a target iSCSI Qualified Name (IQN) along with IP addresses and TCP/IP port numbers of the target portals which listen for and serve requests from iSCSI initiators.

With the technique mentioned directly above a connection may be established by the iSCSI initiator to any iSCSI target portal group as long as a TCP/IP connection can be established between the physical initiator ethernet port and the physical target ethernet port part of the target portal group. Modern computer systems can have ethernet ports of varying speed, e.g., 1 Gigabyte/second, 10 Gigabytes/second, 25 Gigabytes/second, 50 Gigabytes/second, 100 Gigabytes/second, etc. While it is possible for two ethernet ports on initiator and target operating at different speeds to establish TCP/IP connectivity through switched ethernet fabric, for the purpose of data transfer, it would be more efficient for iSCSI connections to be established between ports of the same speed. Current discovery processes have no mechanism to match port speeds at an initiator and target. As a result, this can only be achieved by prior knowledge and manual selection of discovered targets portal for connection established between initiator target ports having same port speed. If not selected properly, this may lead to slow data transfers, and bottlenecks in the I/O path.

iSCSI Extensions over remote direct memory access (RDMA), hereafter referred to as "iSER", is a data mover protocol which uses the administrative interface of iSCSI but leverages RDMA transports for data movement. Most notably, the discovery of iSER target endpoints is done in the same manner as native iSCSI endpoints.

Although iSER allows some different transport protocols which adhere to the iSER data mover interface, owing to the differences in protocols, iSER initiator and target portals cannot interoperate if an initiator and target portal differ in the protocol capability. Moreover, for initiators and targets which support multiple adapters/endpoints differing in data movement protocol, conventional techniques do not include differentiating lower level iSER protocol capabilities. As a result, this can only be achieved by prior knowledge and manual selection of discovered targets portal for connection established between initiator target ports having same protocol capability. If not selected properly, this may lead to failed connection attempts, which is time consuming, frustrating to customers, etc.

Various embodiments and/or approaches described herein facilitate connection between an initiator and a target based on establishing that the target matches an identity key value pair and one or more target characteristic key value pairs specified in a request of the initiator.

Figure 3:
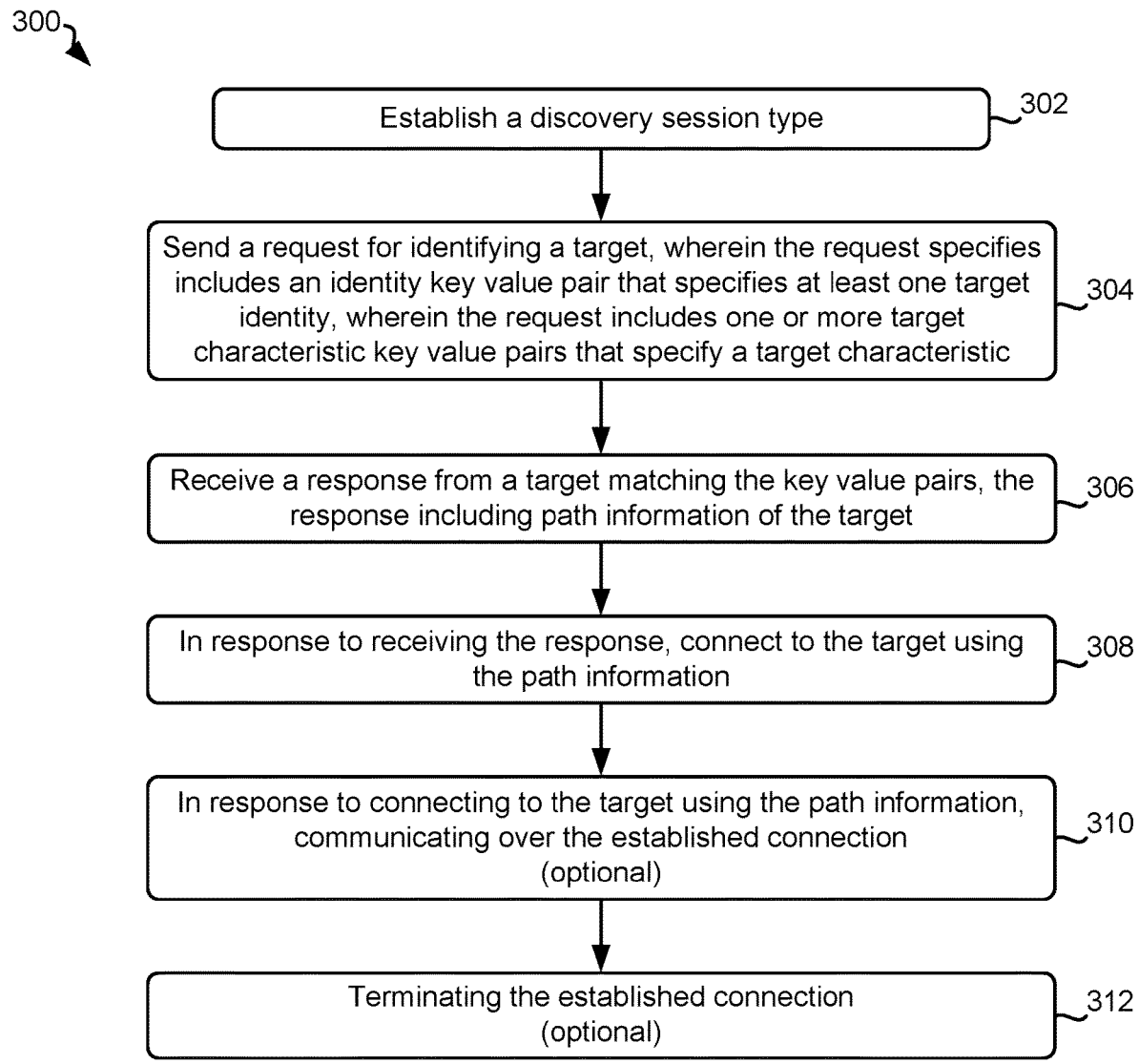
FIG. 3 is a flowchart of a method, in accordance with one embodiment.

Now referring to FIG. 3, a flowchart of a method 300 is shown according to one embodiment. The method 300 may be performed in accordance with the present invention in any of the environments depicted in FIGS. 1-2, among others, in various embodiments. Of course, more or less operations than those specifically described in FIG. 3 may be included in method 300, as would be understood by one of skill in the art upon reading the present descriptions.

Each of the steps of the method 300 may be performed by any suitable component of the operating environment. For example, in various embodiments, the method 300 may be partially or entirely performed by a computer, or some other device having one or more processors therein. The processor, e.g., processing circuit(s), chip(s), and/or module(s) implemented in hardware and/or software, and preferably having at least one hardware component may be utilized in any device to perform one or more steps of the method 300. Illustrative processors include, but are not limited to, a central processing unit (CPU), an application specific integrated circuit (ASIC), a field programmable gate array (FPGA), etc., combinations thereof, or any other suitable computing device known in the art.

It should be prefaced that although various operations of method 300 are herein described with respect to a perspective of an initiator, as will be described elsewhere herein, in other embodiments and/or approaches, descriptions may be made with respect to a target, e.g., see method 400.

Operation 302 of method 300 includes establishing a discovery session type. According to some approaches, the discovery session type may be for iSCSI/iSER sessions. Moreover, the discovery session type is preferably established by an initiator, e.g., from any initiator portal to any target portal. However, upon the initiator establishing the discovery session type, the initiator may not know and/or specify the target name, e.g., the initiator does not know the IQN and/or the extended unique identifier (EUI) of any targets. Rather, as will become apparent to one of ordinary skill in the art upon reading the present descriptions, in establishing the discovery session type, the initiator may initiate discovery of a target that the initiator may connect to.

A request for identifying a target may be sent to one or more locations, e.g., see operation 304. In one approach, the request is sent directly to a network fabric that may include targets. In another approach, the request may additionally and/or alternatively be sent to an intermediary entity, e.g., such as an Internet Storage Name Service (iSNS) server. In yet another approach, the request may additionally and/or alternatively be sent to a target device.

In some preferred approaches, the request for identifying a target may be sent while the discovery session is in a full feature phase, e.g., subsequent the discovery session being in a login phase, in response to the discovery session entering a full feature phase, in response to the discovery session being in a full feature phase for a predetermined period of time, etc.

The request for identifying a target may be sent by the initiator to any address within the network that may include targets. For example, in one approach, the request for identifying a target may be sent to locations that are known to have previously included targets. In another approach, the request for identifying a target may be sent to locations that are within a predetermined discoverable range of the initiator, e.g., within a wireless broadcast range of the request for identifying the target, within a predefined physical proximity of a physical location of the initiator, etc.

According to some preferred approaches, the request for identifying a target may include more than one identity key value pair, e.g., two identity key value pairs, three identity key value pairs, four identity key value pairs, etc. In other words, the request specifies a type of target, e.g., as specified by the key value pairs, that the initiator is seeking to establish a connection with. The key value pairs may be any type of target attribute of a target. For example, in some approaches, the request for identifying a target includes an identity key value pair that specifies at least one target identity. As will become apparent to one skilled in the art upon reading various of the present descriptions herein, a specified target identity may be used to clarify one or more specific targets for connecting to, based on such targets matching the specified target identity. In some approaches, such targets may be at least a portion of the targets that are available for connecting to.

A target identity specified by the identity key value pair, may in some approaches, include all targets. A target identity specified by the identity key value pair including all targets may in some approaches be represented by computer code and/or pseudocode. For example, in one approach, a target identity specified by the identity key value pair including all targets may be represented by the key value of the request including "SendTargets" and the value may include "All", e.g., SendTargets=All.

In some other approaches, a target identity specified by the identity key value pair includes a name of the target, e.g., such as an iSCSI target name of the target. A target identity specified by the identity key value pair including a name of the target may in some approaches be represented by computer code and/or pseudocode. For example, the target identity specified by the identity key value pair including a name of the target may be represented by the key value of a request including "SendTargets" and the value may include "Target name", e.g., SendTargets=<Target name>, <iSCSI Target Name>, etc.

In some approaches, the request for identifying a target preferably also includes a target characteristic key value pair that specifies a characteristic of a target, or target characteristic. The target characteristic key value pair may specify any characteristic of a target. As will become apparent to one skilled in the art upon reading various of the present descriptions herein, a specified target characteristic may be used to clarify one or more specific targets available for the initiator to connect to, e.g., based on such targets having/matching the specified target characteristic (see operations 306-308). In some approaches, such targets may be a portion of the targets, e.g., within a network, that are available for connecting to.

According to various approaches, the target characteristic specified by the target characteristic key value pair may include a port type of the target, e.g., Ethernet, serial ports, parallel ports, etc. Although the characteristic may include any type of port type, according to some non-limiting approaches, the port type specified by the target characteristic key value pair may be, e.g., a TCP port type, a ROCEv1 port type, a ROCEv2 port type, an iWARP port type, an Infiniband port type, etc. The target characteristic specified by the target characteristic key value pair may in some approaches be represented by computer code and/or pseudocode. For example, in one approach, the target characteristic may be represented by the key value of a request including "PortType" and the value may include "<List of port types>", e.g., PortType=<List of port types>. In such an approach, the target characteristic may be represented by the key value of a request including "TargetAddress" and the value may include one or more of, e.g., <hostname-or-ipaddress>, [:<tcp-port>], <portal-group-tag>, etc.

The target characteristic specified by the target characteristic key value pair may in some approaches include a port speed supported by the target. In some approaches, the port speed supported by the target may be at least a predetermined port speed, e.g., at least 100 Megabytes/second, at least 500 Megabytes/second, at least one Gigabyte/second, at least 100 Gigabytes/second, etc. According to a more specific approach, the port speed supported by the target may be a specific predetermined port speed, e.g., one Gigabyte/second, ten Gigabytes/second, twenty-five Gigabytes/second, forty Gigabytes/second, fifty Gigabytes/second, 100 Gigabytes/second, etc. The target characteristic specified by the target characteristic key value pair may in some approaches be represented by computer code and/or pseudocode. For example, in one approach, the target characteristic specified by the target characteristic key value pair may be represented by the key value of the request including "PortSpeed" and the value may include "<List of speeds supported>", e.g., PortSpeed=<List of speeds supported>.

Operation 306 of method 300 includes receiving a response from a target matching the key value pairs. In preferred approaches, the target matching the key value pairs may be characterized by the target having, e.g., adhering to, the key value pairs previously specified by the initiator in the request. Note that in the present embodiment, reference is primarily made to the response being received from a single target. However, in some other approaches, more than one target may send one or more responses to the initiator. Note that in the present embodiment, subsequent to a response being sent by one or more targets, the received response may include only a subset of the portals of the target which adhere to the key-value pairs identifying the target characteristics as specified by the key-value pairs sent by the initiator. A target may have multiple target portal groups, each of which may differ in characteristics. However, in some approaches, not all target portal groups match the characteristics specified by the initiator.

In some approaches, the target sending the response to the initiator may be a member of a target network entity which the requesting initiator is authorized to access. Accordingly, the response may include path information of the target, e.g., a target name, IP address-port pairs, portal group tags, etc.

As a result of the request described herein including more than one key value pair, e.g., in the present embodiment one identity key value pair and one or more target characteristic key value pairs, the response from a target matching the key value pairs is relatively more refined than the request would otherwise be if the request included only one key value pair. This refining is useful in terms of network performance of the network(s) that includes the initiator and/or the target, because a single "SendTargets" discovery request from any initiator to a target may otherwise return a response including all targets without specifying capability of such targets prior to sending the response. Moreover, a single "SendTargets" discovery request may otherwise result in an iSCSI/iSER initiator trying to establish multiple connections from all initiator ports to all target ports. These results are problematic, as requests between incompatible ports, e.g., an iWARP initiator port and a ROCE target port or vice versa, and/or protocols may result in failed connection attempts without specific error messages. Without such error messages, such failed connection attempts are difficult to debug.

For purposes of a more specific example, assume a plurality of portals initially qualify as a target in response to the request sent by the initiator including an identity key value pair that specifies a target identity that includes all targets. This plurality of portals may be further refined to include only a single target in response to the request also including a target characteristic key value pair that includes a port type of the target. For example, in response to the request also including an identity key value pair that includes a port type of the target, the plurality of portals may be refined to potentially include one target that includes the target identity specified by the request and that includes the port type specified in the request. Moreover, no response is received from the portals that include the target identity specified by the request, but do not include the port type specified in the request. As a result, session establishment errors that may have otherwise occurred in attempting to connect to portals that include the target identity specified by the request, but do not include the port type specified in the request, are avoided. This avoidance of errors results in a preservation of processing potential that would otherwise be unnecessarily expended in attempting to and likely failing to make such connections.

Another result of the request described herein including more than one key value pair is that the responding target(s) have characteristics that are relatively more compatible with the characteristics of the initiator. This is particularly beneficial to processing speeds of communication that occurs over an established connection between the initiator and the target. Specifically, this is because otherwise initiating connectivity sessions from lower bandwidth initiator ports to higher bandwidth target ports can present bottlenecks in read I/O paths. Moreover, this may otherwise lead to congestion and dropped frames at the lower bandwidth initiator port/connected switch port as a result of a target port serving data at a faster rate than the initiator can consume the data. Similarly, initiating sessions from higher bandwidth initiator ports to lower bandwidth target ports may otherwise present bottlenecks in write I/O paths. Such mismatched bandwidth characteristics may additionally otherwise lead to congestion and dropped frames at the lower bandwidth target port/connected switch port as a result of the initiator port serving write data at a faster rate than the target can consume the data. In sharp contrast, several of the embodiments and/or approaches described herein include receiving a response from a target that matches the bandwidth(s) specified in the request send by the initiator. As a result of the initiator using path information received in the response from the target (see operation 308) for establishing a connection between the initiator and a target having the same bandwidth, such bottlenecks in read and write I/O path are avoided. This avoidance of session bottlenecks results in a preservation of processing potential that would otherwise be potentially unnecessarily expended in connecting to a portal having an mis-matching port speed.

In response to receiving the response, a connection is created between the initiator and the target using the path information, e.g., see operation 308 of method 300. According to some approaches, the connection is preferably established over a combination of network and transport layers that are associated with the initiator and/or target. According to a more specific approach, creating the connection may in one approach include establishing a TCP/IP connection between a physical ethernet port of the initiator and a physical ethernet port of the target.

In some approaches, the initiator may perform a determination as to which target to connect to. For example, in some approaches, more than one response may be received by the initiator. In such approaches, in response to receiving more than one response, the initiator may determine, e.g., using a processor, using a controller, etc., a target to connect to, based on predefined criteria. Accordingly, in such approaches, each response may indicate specific key value pairs of a target sending the given response. The predefined criteria used in such a determination may include, e.g., connecting to a target having the fastest port speed, connecting to a target having a highest priority port type from a predetermined list, connecting to a target of a request that was received first by the initiator, randomly selecting one of the targets for connecting to, etc. Moreover, according to some other approaches, the response from the target may identify other targets that in addition to the target, match the identity key value pair of the request.

According to another example, the target identity specified by the identity key value pair of the request may include a name of the target, and the target characteristic key value pair(s) may specify multiple characteristic of a target. In other words, the request specifies a particular target that the initiator is to connect to, and furthermore requests an accounting of multiple characteristics of a target, e.g., to determine which of the multiple characteristics of a target are available for use in establishing a connection thereto. Upon the initiator receiving a response from the target that matches the specified target identity, the initiator may establish one or more connectivity sessions, e.g., over a pre-established connection between the initiator and the target matching the target name specified in the request, between initiator port(s) and target port(s) that match the one or more characteristics specified in the request, etc.

In some approaches, method 300 may include selecting, using a controller of the initiator, which endpoint of the initiator to use for establishing the connection, e.g., port, IP address, etc. For example, in response to the initiator including more than one port, method 300 may optionally include selecting a port of the initiator to use for connecting with one or more ports of the target. Such a selection may be performed, e.g., using a random selection of a port, using a least frequently used port, using a port that is determined to be currently operational, etc. In some approaches, more than one port of the initiator may be used for connecting to the port of the target.

In some approaches, operation 308 may optionally include sending a request to the target to connect to the ports of the target selected by the initiator. In response to the initiator receiving an indication that the target grants access to the selected port, the initiator may connect to the port of the target. In some other approaches, such a request may not be sent, and the initiator may simply connect to a selected port of the target without requesting to do so. In other words, in such approaches, the target may grant access to such ports in the response received by the initiator, e.g., see operation 306.

In response to connecting to the target using the path information, method 300 includes optionally communicating over the established connection, e.g., see operation 310. According to one approach, communicating over the established connection may include the initiator sending data over the established connection to the target. In another approach, communicating over the established connection may additionally and/or alternatively include the initiator receiving data sent by the target over the established connection.

At any time and/or for any reason, the established connection between the initiator and the target may be terminated, e.g., see operation 312. Depending on the approach, the established connection may be terminated by the initiator and/or the target. For example, in some approaches, the initiator may specify a piece of data, which after being received by the target, the initiator and/or the target may be configured to terminate the established connection, e.g., a final piece of data. Depending on the approach, an indicator of such a specification may include, e.g., a flag, a predetermined known data sequence that is known to the initiator and/or known to the target to indicate a final piece of data, a notification, etc.

In some approaches, a record that documents the established and then terminated connection may be stored at any one or more locations, e.g., on the initiator, on the target, with an administrator of a network containing the initiator and/or the target, in a cloud-based storage, etc. One or more of such records may optionally be considered during any subsequent instance of establishing a connection between one or more initiator(s) and one or more target(s).

Figure 4:
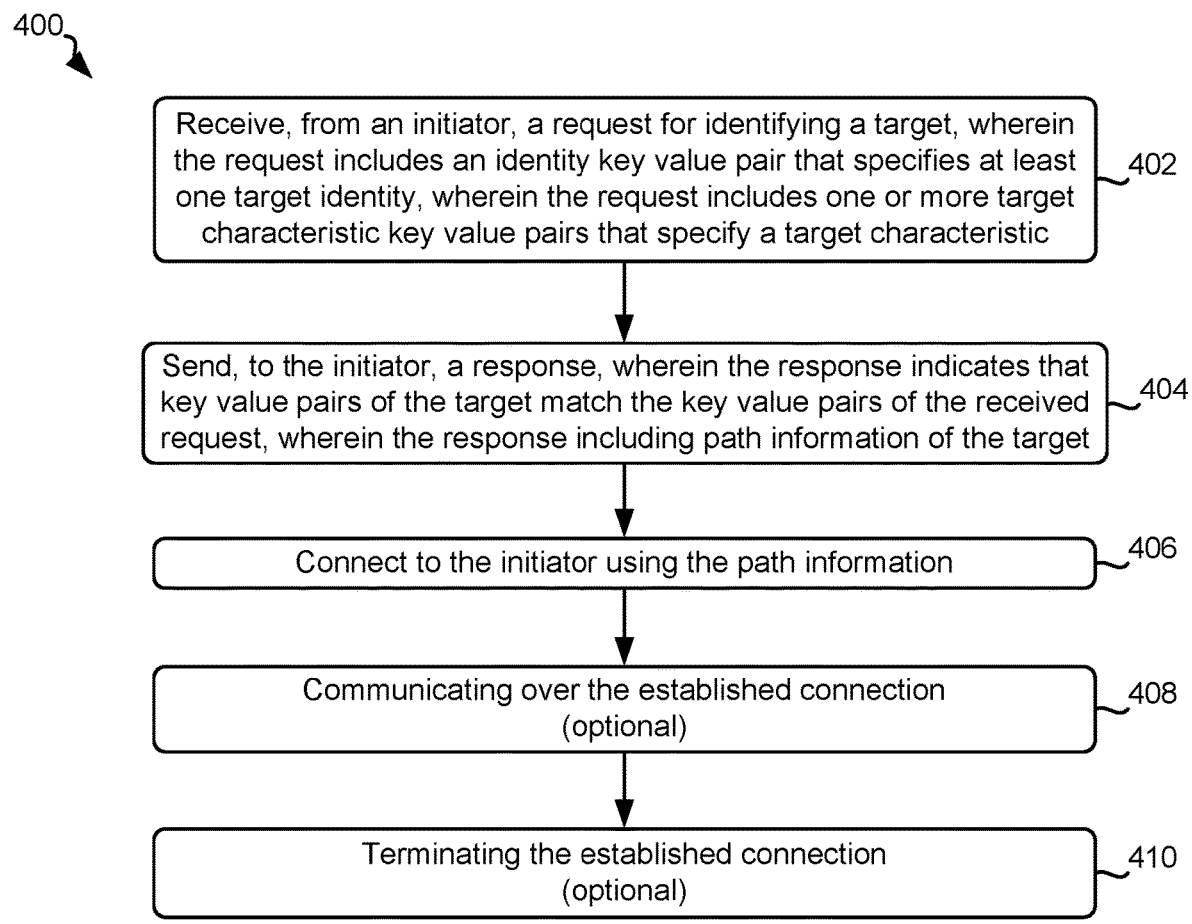
FIG. 4 is a flowchart of a method, in accordance with one embodiment.

Now referring to FIG. 4, a flowchart of a method 400 is shown according to one embodiment. The method 400 may be performed in accordance with the present invention in any of the environments depicted in FIGS. 1-3, among others, in various embodiments. Of course, more or less operations than those specifically described in FIG. 4 may be included in method 400, as would be understood by one of skill in the art upon reading the present descriptions.

Each of the steps of the method 400 may be performed by any suitable component of the operating environment. For example, in various embodiments, the method 400 may be partially or entirely performed by a computer, or some other device having one or more processors therein. The processor, e.g., processing circuit(s), chip(s), and/or module(s) implemented in hardware and/or software, and preferably having at least one hardware component may be utilized in any device to perform one or more steps of the method 400. Illustrative processors include, but are not limited to, a central processing unit (CPU), an application specific integrated circuit (ASIC), a field programmable gate array (FPGA), etc., combinations thereof, or any other suitable computing device known in the art.

It should be prefaced that various operations of method 400 are described below with respect to a perspective of a target, e.g., as opposed to a perspective of an initiator, e.g., see method 300. Accordingly, characteristics of the requests and responses described below may be the same or similar to those described above.

Operation 402 of method 400 includes receiving, from an initiator, a request for identifying a target. In some approaches, the request includes an identity key value pair that specifies at least one target identity. Moreover, the request may additionally and/or alternatively include one or more target characteristic key value pairs that specify a target characteristic.

The target may send a response to the initiator with target portals matching the identity and target characteristic key value pairs as specified by the initiator request, e.g. see operation 404 of method 400. The target portals sent in the response may be a subset of the overall target portals. In some approaches, the response sent to the initiator includes an indication that indicates that key value pairs of the target match the key value pairs of the received request. Moreover, the response preferably includes path information of the target.

Operation 406 of method 400 includes the target connecting to the initiator using the path information and/or the target being connected to by the initiator using the path information.

In response to connecting to the initiator, method 400 includes optionally communicating over the established connection, e.g., see operation 408. According to one approach, communicating over the established connection may include the target sending data over the established connection to the initiator. In another approach, communicating over the established connection may additionally and/or alternatively include the target receiving data sent by the initiator over the established connection.

At any time and/or for any reason, the established connection between the initiator and the target may be terminated, e.g., see operation 410. Depending on the approach, the established connection may be terminated by the initiator and/or the target. For example, in some approaches, the target may indicate a piece of data, which after being output by the target, the target may be configured to terminate the established connection, e.g., a final piece of data. Depending on the approach, such an indicator may include, e.g., a flag, a predetermined known data sequence that is known to the initiator and/or known to the target to indicate a final piece of data, a notification, etc.

In some approaches, a record that documents the established and then terminated connection may be stored at any one or more locations, e.g., on the initiator, on the target, with an administrator of a network containing the initiator and/or the target, in a cloud-based storage, etc. One or more of such records may optionally be considered for any subsequent instance of establishing a connection between one or more initiator(s) and one or more target(s).

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a LAN or a WAN, or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Moreover, a system according to various embodiments may include a processor and logic integrated with and/or executable by the processor, the logic being configured to perform one or more of the process steps recited herein. The processor may be of any configuration as described herein, such as a discrete processor or a processing circuit that includes many components such as processing hardware, memory, I/O interfaces, etc. By integrated with, what is meant is that the processor has logic embedded therewith as hardware logic, such as an application specific integrated circuit (ASIC), a FPGA, etc. By executable by the processor, what is meant is that the logic is hardware logic; software logic such as firmware, part of an operating system, part of an application program; etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a central processing unit (CPU), an integrated circuit (IC), a graphics processing unit (GPU), etc.

It will be clear that the various features of the foregoing systems and/or methodologies may be combined in any way, creating a plurality of combinations from the descriptions presented above.

It will be further appreciated that embodiments of the present invention may be provided in the form of a service deployed on behalf of a customer to offer service on demand.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A computer-implemented method, comprising:
    establishing, by an initiator, a discovery session type;
    sending, by the initiator, a request for identifying a target, wherein the request includes an identity key value pair that specifies at least one target identity, wherein the request includes a target characteristic key value pair that specifies a target characteristic, wherein the target characteristic specified by the target characteristic key value pair includes a port speed supported by the target;
    receiving, by the initiator, a response from a target matching the key value pairs, the response including path information of the target; and
    in response to receiving the response, connecting, by the initiator, to the target using the path information.

2. The computer-implemented method of claim 1, wherein the at least one target identity specified by the identity key value pair includes all targets.

3. The computer-implemented method of claim 1, wherein the at least one target identity specified by the identity key value pair includes a name of the target.

4. The computer-implemented method of claim 1, wherein the target characteristic specified by the target characteristic key value pair includes a port type of the target.

5. The computer-implemented method of claim 4, wherein the port type of the target is a port type selected from the group consisting of: ROCEv1, ROCEv2, and iWARP.

6. A computer-implemented method, comprising:
    receiving, by a target, a request from an initiator, wherein the request includes an identity key value pair that specifies at least one target identity, wherein the request includes a target characteristic key value pair that specifies a target characteristic, wherein the received request is sent by the initiator to the target during a full feature phase of a discovery session established by the initiator;
    sending, by the target, a response to the initiator, wherein the response indicates that the target has the target identity and the target characteristic specified in the received request, wherein the response includes path information of the target; and
    connecting, by the target, to the initiator using the path information.

7. The computer-implemented method of claim 6, wherein the at least one target identity specified by the identity key value pair includes all targets.

8. The computer-implemented method of claim 6, wherein the at least one target identity specified by the identity key value pair includes a name of the target.

9. The computer-implemented method of claim 6, wherein the target characteristic specified by the target characteristic key value pair includes a port type of the target.

10. The computer-implemented method of claim 9, wherein the port type of the target is a port type selected from the group consisting of: ROCEv1, ROCEv2, and iWARP.

11. The computer-implemented method of claim 6, wherein the target characteristic specified by the target characteristic key value pair includes a port speed supported by the target.

12. A computer program product for establishing a connection between an initiator and a target, the computer program product comprising a computer readable storage medium having program instructions embodied therewith, the program instructions readable and/or executable by an initiator to cause the initiator to:
  establish, by the initiator, a discovery session type;
  send, by the initiator, a request for identifying a target, wherein the request includes an identity key value pair that specifies at least one target identity, wherein the request includes a target characteristic key value pair that specifies a target characteristic;
  receive, by the initiator, responses from a plurality of targets each having the target identity and the target characteristic, the responses each including path information of the associated target;
  select, by the initiator, one of the plurality of targets to connect to; and
  connect, by the initiator, to the selected target using the path information included in the response received from the selected target.

13. The computer program product of claim 12, wherein the at least one target identity specified by the identity key value pair includes all targets.

14. The computer program product of claim 12, wherein the at least one target identity specified by the identity key value pair includes a name of the target.

15. The computer program product of claim 12, wherein the target characteristic specified by the target characteristic key value pair includes a port type of the target.

16. The computer program product of claim 15, wherein the port type of the target is a port type selected from the group consisting of: ROCEv1, ROCEv2, and iWARP.

17. The computer program product of claim 12, wherein the target characteristic specified by the target characteristic key value pair includes at least a predetermined threshold port speed being supported by the target,
  wherein selecting one of the plurality of targets to connect to includes:
    comparing port speeds of the plurality of targets, and
    selecting one of the targets having a fastest relative port speed.

* * * * *